US012667523B2

(12) United States Patent
Palladino

(10) Patent No.: US 12,667,523 B2
(45) Date of Patent: Jun. 30, 2026

(54) HEATED BABY BOTTLE ASSEMBLY

(71) Applicant: Carmen Palladino, Superior, WI (US)

(72) Inventor: Carmen Palladino, Superior, WI (US)

( * ) Notice: Subject to any disclaimer, the term of this patent is extended or adjusted under 35 U.S.C. 154(b) by 762 days.

(21) Appl. No.: 18/091,125

(22) Filed: Dec. 29, 2022

(65) Prior Publication Data

US 2024/0216226 A1      Jul. 4, 2024

(51) Int. Cl.
| | |
|---|---|
| *A61J 9/02* | (2006.01) |
| *A47J 36/24* | (2006.01) |
| *A61J 11/00* | (2006.01) |
| *A61J 11/04* | (2006.01) |

(52) U.S. Cl.
CPC ............. *A61J 9/02* (2013.01); *A47J 36/2433* (2013.01); *A61J 11/0015* (2013.01); *A61J 11/04* (2013.01); *A61J 2200/42* (2013.01); *A61J 2200/50* (2013.01); *A61J 2200/72* (2013.01); *A61J 2200/76* (2013.01)

(58) Field of Classification Search
CPC . A61J 9/02; A61J 11/0015; A61J 11/04; A61J 2200/42; A61J 2200/50; A61J 2200/72; A61J 2200/76; A47J 36/2433
See application file for complete search history.

(56) References Cited

U.S. PATENT DOCUMENTS

| | | |
|---|---|---|
| 7,059,387 B2 | 6/2006 | Kolowich |
| 8,131,137 B1 | 3/2012 | Cowles |

| | | | |
|---|---|---|---|
| 8,866,050 B2 | 10/2014 | McBean | |
| 2004/0140304 A1* | 7/2004 | Leyendecker | A47J 36/2433 219/521 |
| 2004/0217102 A1* | 11/2004 | Berger | A47J 36/2433 219/386 |
| 2006/0081599 A1* | 4/2006 | Anderson | A47J 36/2433 219/438 |
| 2008/0087270 A1* | 4/2008 | Shaikh | F28D 20/028 215/11.1 |
| 2012/0085724 A1 | 4/2012 | Barker | |
| 2013/0200064 A1* | 8/2013 | Alexander | A47J 36/2483 219/441 |
| 2014/0190357 A1* | 7/2014 | Mak | A47J 36/2438 99/453 |
| 2014/0339240 A1* | 11/2014 | Moore | A45F 5/00 220/592.2 |
| 2016/0242598 A1* | 8/2016 | Alexander | H05B 3/06 |

(Continued)

FOREIGN PATENT DOCUMENTS

WO      WO2014138771      9/2014

*Primary Examiner* — Robert G Bachner

(57)                ABSTRACT

A heated baby bottle assembly includes a baby bottle for containing a fluid baby food. An insulating layer is wrapped around the baby bottle and the insulating layer is comprised of a thermally insulating material thereby inhibiting thermal communication between the baby bottle and ambient air. A pair of nipples is provided and a respective one of the nipples is removably attachable to the baby bottle thereby facilitating the fluid baby food to be consumed through the respective nipple. A heating element is integrated into the baby bottle to heat the baby bottle when the heating element is turned on thereby heating the fluid baby food in the baby bottle. A control unit is integrated into the baby bottle and the control unit actuates the heating element to a selectable temperature thereby facilitating the fluid baby food to be retained at the selected temperature.

9 Claims, 6 Drawing Sheets

(56)     References Cited

U.S. PATENT DOCUMENTS

| | | | |
|---|---|---|---|
| 2017/0086620 A1* | 3/2017 | Duineveld | A47J 36/2438 |
| 2019/0313843 A1* | 10/2019 | Furrer | A47J 36/2438 |
| 2020/0022877 A1 | 1/2020 | Li | |
| 2021/0204741 A1* | 7/2021 | Burroni | A47J 27/004 |
| 2023/0240475 A1* | 8/2023 | Orofino | B65D 81/3211 |
| | | | 220/592.17 |
| 2023/0262847 A1* | 8/2023 | Rodriguez | G01K 13/00 |
| | | | 219/523 |

* cited by examiner

HEATED BABY BOTTLE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to baby bottle device and more particularly pertains to a new baby bottle device for retaining fluid baby food at a constant temperature. The device includes a baby bottle and a heating element integrated into the baby bottle. The device includes a control unit integrated into the baby bottle which includes a temperature increase button, a temperature decrease button and a display for displaying a selected temperature. The device includes a rechargeable battery and a charge port.

(2) Description of Related Art Including Information Disclosed Under 37 CFR 1.97 and 1.98

The prior art relates to baby bottle devices including a liquid receptacle device which includes a bottle and a phase change material integrated into the bottle for absorbing thermal energy from a fluid contained in the bottle. The prior art discloses a steam heating device for heating water to produce steam for warming milk. The prior art discloses a bottle warming device that includes a receiver for receiving a baby bottle and a heating element integrated into the warming device to warm the baby bottle. The prior art discloses an insulated beverage container which includes a solution to produce an exothermic reaction to heat a beverage contained in the insulated beverage container.

BRIEF SUMMARY OF THE INVENTION

An embodiment of the disclosure meets the needs presented above by generally comprising a baby bottle for containing a fluid baby food. An insulating layer is wrapped around the baby bottle and the insulating layer is comprised of a thermally insulating material thereby inhibiting thermal communication between the baby bottle and ambient air. A pair of nipples is provided and a respective one of the nipples is removably attachable to the baby bottle thereby facilitating the fluid baby food to be consumed through the respective nipple. A heating element is integrated into the baby bottle to heat the baby bottle when the heating element is turned on thereby heating the fluid baby food in the baby bottle. A control unit is integrated into the baby bottle and the control unit actuates the heating element to a selectable temperature thereby facilitating the fluid baby food to be retained at the selected temperature.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
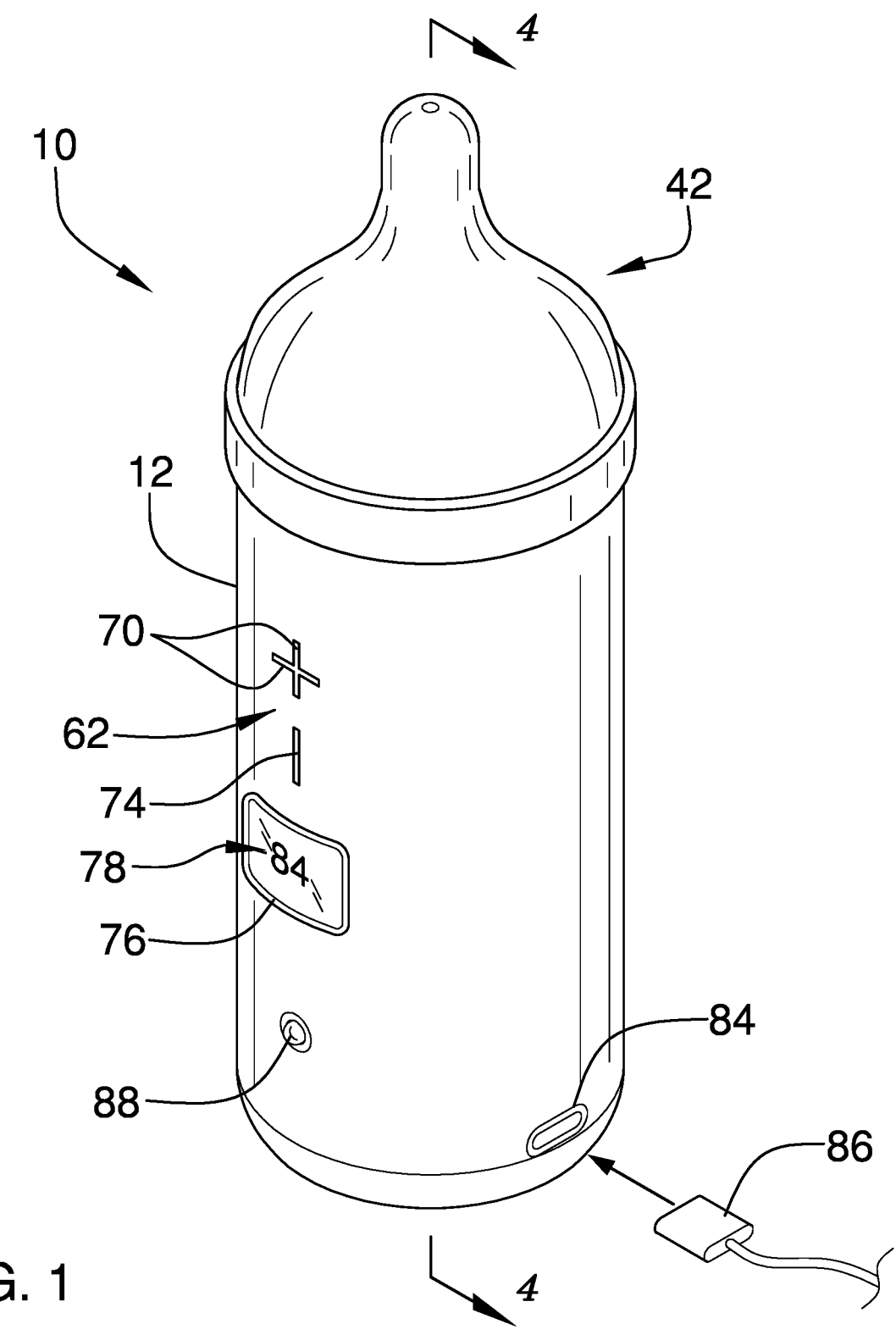
FIG. 1 is a front perspective view of a heated baby bottle assembly according to an embodiment of the disclosure.
Figure 2:
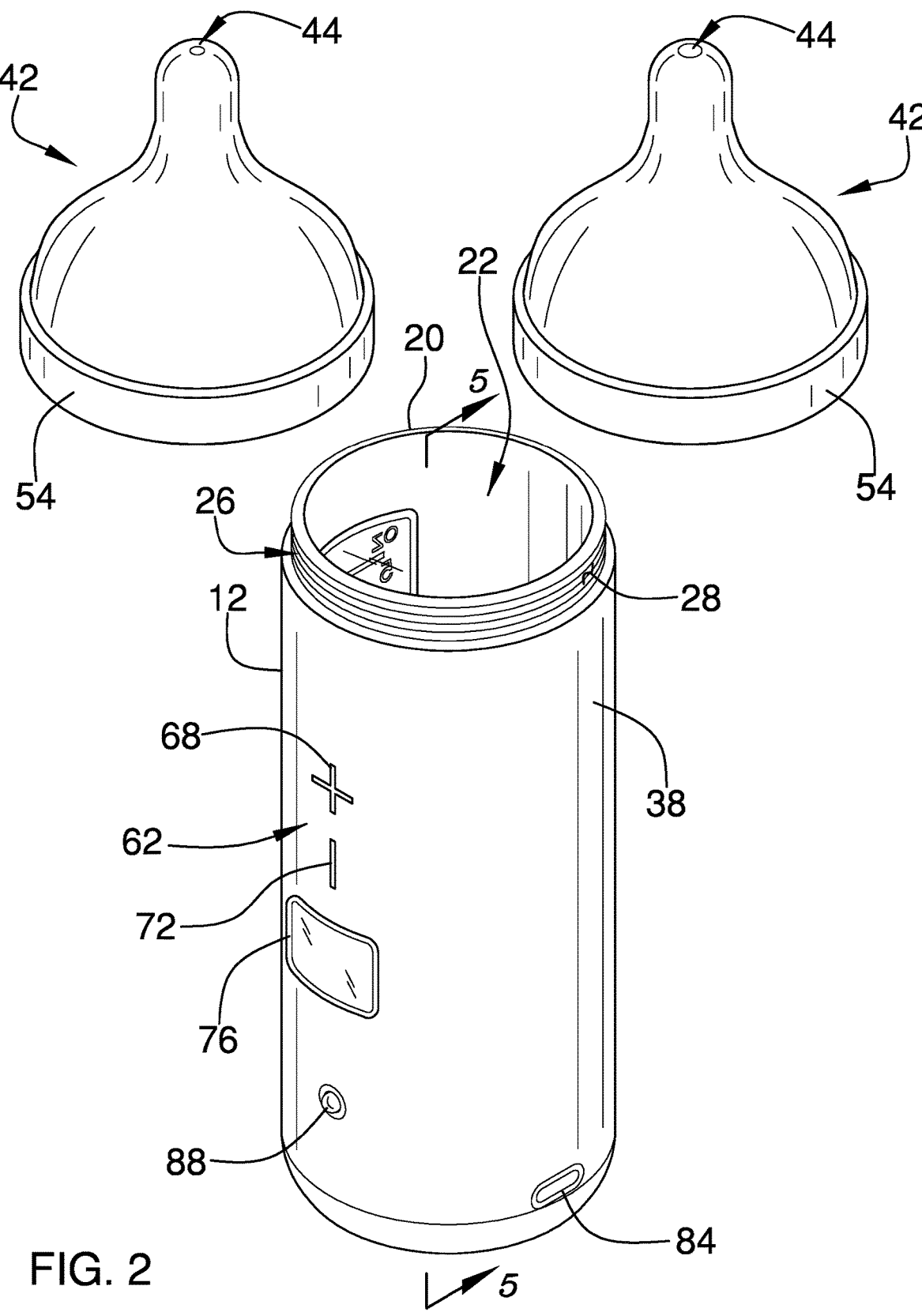
FIG. 2 is an exploded perspective view of an embodiment of the disclosure.
Figure 3:
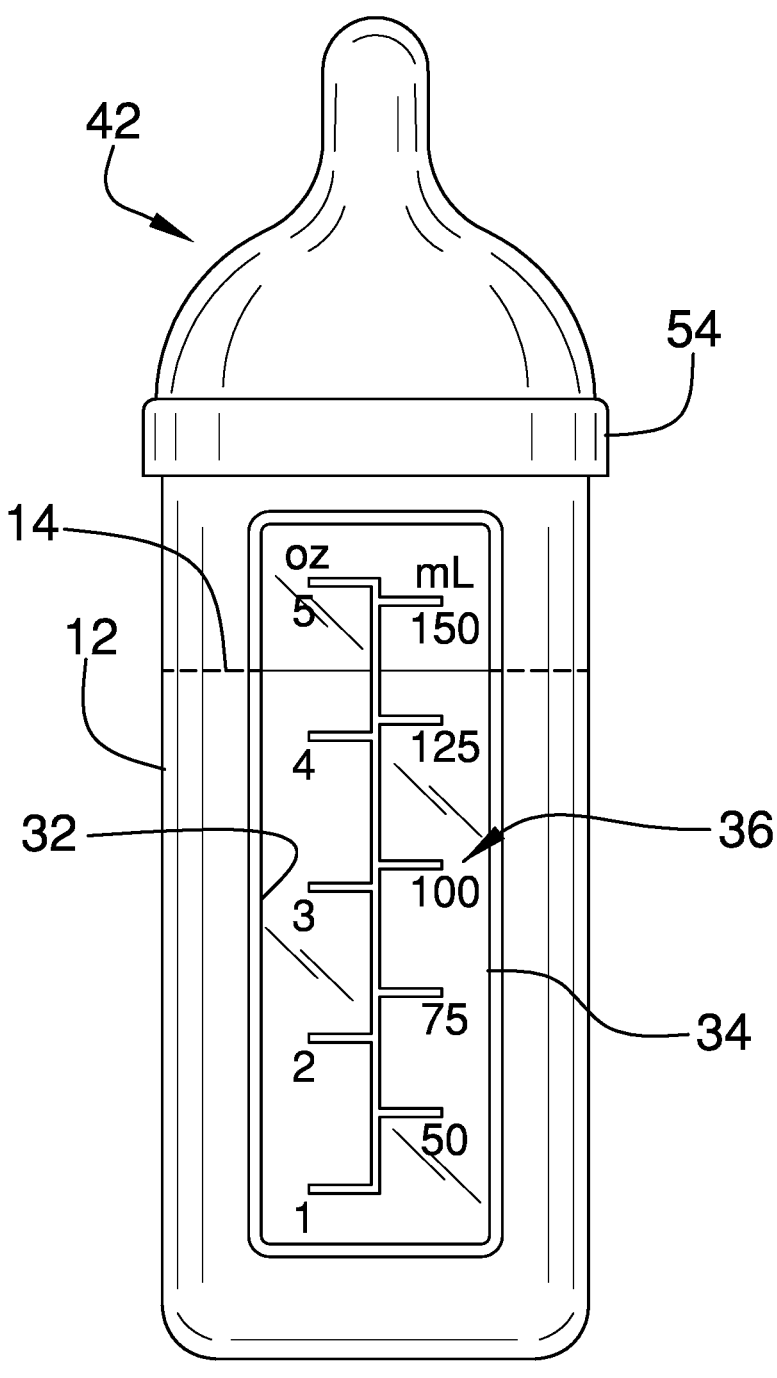
FIG. 3 is a back view of an embodiment of the disclosure.
Figure 4:
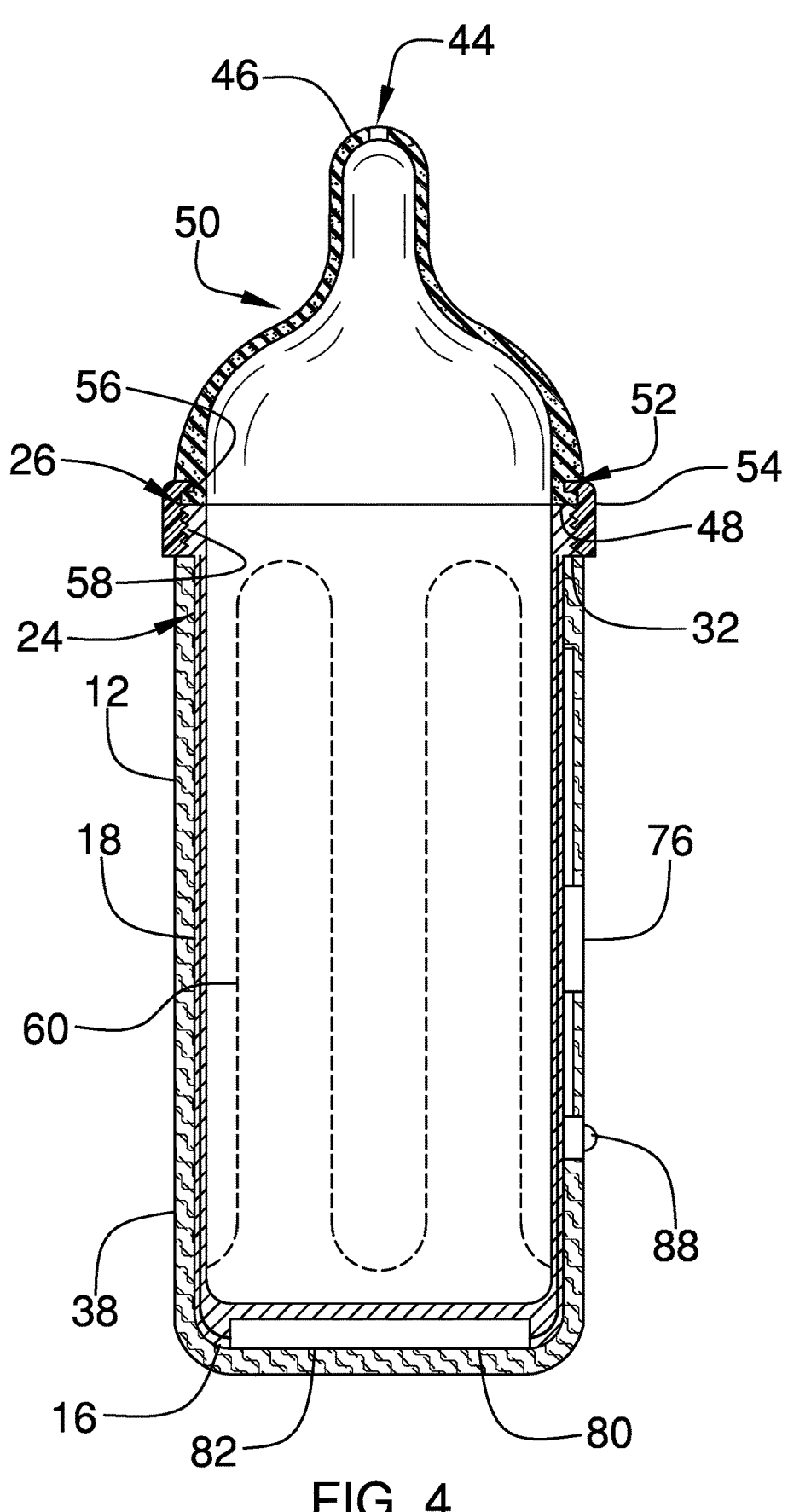
FIG. 4 is a cross sectional view taken along line 4-4 of FIG. 1 of an embodiment of the disclosure.
Figure 5:
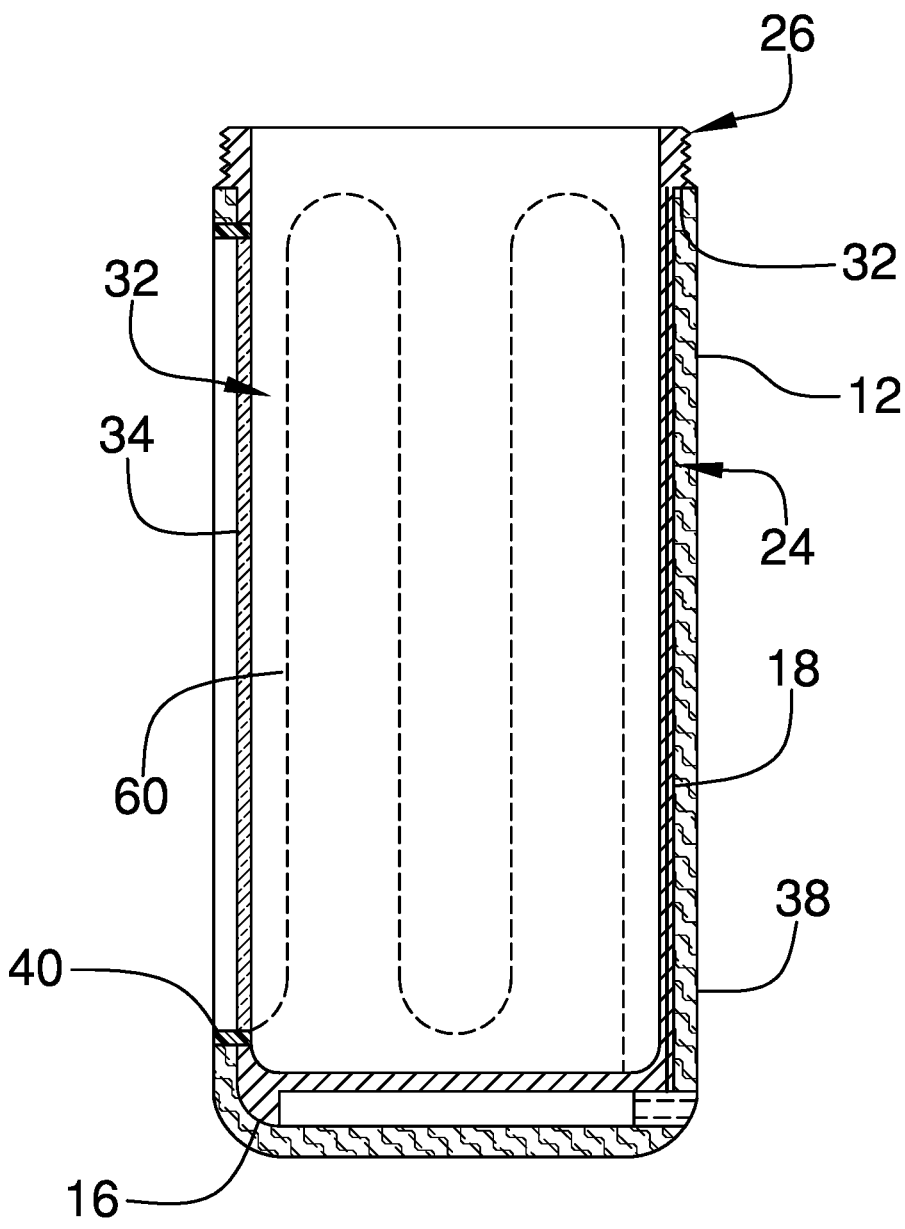
FIG. 5 is a cross sectional view taken along line 4-4 of FIG. 1 of an embodiment of the disclosure.
Figure 6:
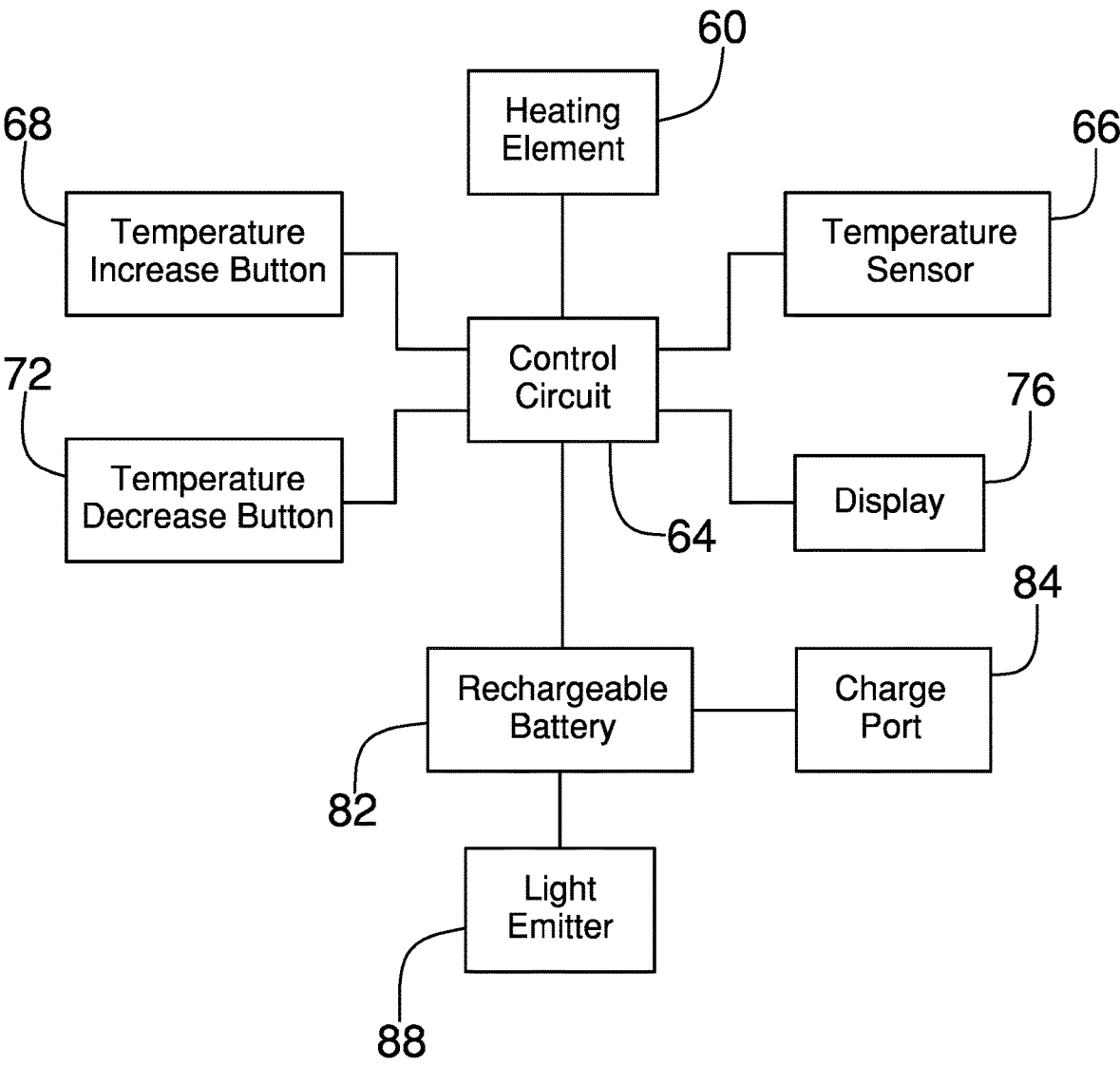
FIG. 6 is a schematic view of an embodiment of the disclosure.

With reference now to the drawings, and in particular to FIGS. 1 through 6 thereof, a new baby bottle device embodying the principles and concepts of an embodiment of the disclosure and generally designated by the reference numeral 10 will be described.

As best illustrated in FIGS. 1 through 6, the heated baby bottle assembly 10 generally comprises a baby bottle 12 for containing a fluid baby food 14. The fluid baby food 14 may comprise breast milk, baby formula or any other type of fluid baby food that is commonly feed to infants. The baby bottle 12 has a bottom wall 16 and an outer wall 18 extending upwardly from the bottom wall 16 and the outer wall 18 has a distal edge 20 with respect to the bottom wall 16 defining an opening 22 into the baby bottle 12. The outer wall 18 has a lower portion 24 that is recessed with respect to an upper portion 26 of the outer wall 18, the upper portion 26 extends from the distal edge 20 toward the bottom wall 16 and an outer surface 28 of the upper portion 26 is threaded. Furthermore, the baby bottle 12 may have a fluid volume ranging between approximately 150.0 ml and 250.0 ml.

The baby bottle 12 has a viewing window 30 extending through the outer wall 18 thereby facilitating a level of the fluid baby food 14 to be visible through the viewing window 30. Additionally, the viewing window 30 is elongated to extend substantially between a threshold 32 of the upper portion 26 of the outer wall 18 and the bottom wall 16. A lens 34 is positioned in the window such that the lens 34 closes the viewing window 30 and the lens 34 is comprised of a translucent material thereby facilitating the fluid baby food 14 to be visible through the lens 34. Furthermore, indicia 36 are applied to the lens 34 and the indicia 36 comprise a graduated scale 38 thereby facilitating the fluid volume of the fluid baby food 14 to be determined.

An insulating layer 38 is wrapped around the baby bottle 12 and the insulating layer 38 is comprised of a thermally insulating material thereby inhibiting thermal communication between the baby bottle 12 and ambient air. The insulating layer 38 completely covers the lower portion 24 of the outer wall 18 and the bottom wall 16. Additionally, the insulating layer 38 has an opening 40 extending through the insulating layer 38 and the opening 40 is aligned with the viewing window 30.

A pair of nipples 42 is provided and a respective one of the nipples 42 is removably attachable to the baby bottle 12 thereby facilitating the fluid baby food 14 to be consumed through the respective nipple 42. Each of the nipples 42 has a dispensing aperture 44 and the dispensing aperture 44 in each of the nipples 42 has a unique size with respect to each other. In this way each of the nipples 42 can dispense a unique amount of fluid baby food 14 with respect to each other. Each of the nipples 42 has a top end 46 and a bottom end 48 and the bottom end 48 of each of the nipples 42 is open.

Each of the nipples 42 curves inwardly at a middle 50 of the nipples 42 such that the top end 46 of the nipples 42 has a diameter that is less than a diameter of the bottom end 48. The dispensing aperture 44 associated with each of the nipples 42 extends through the top end 46. Each of the nipples 42 has a groove 52 extending inwardly on the nipples 42 and the groove 52 on a respective one of the nipples 42 extends around a full circumference of the respective nipple 42. Additionally, the groove 52 on the respective nipple 42 is spaced from the bottom end 48 of the respective nipple 42.

A pair of collars 54 is provided and each of the collars 54 extends around the bottom end 48 of a respective one of the nipples 42. Each of the collars 54 has a lip 56 extending into the groove 52 on the respective nipple 42 for retaining each of the collars 54 on the respective nipple 42. Each the collars 54 has an inwardly facing surface 58 and the inwardly facing surface 58 of each of the collars 54 is threaded to threadably engage the outer surface 28 of the upper portion 26 of the outer wall 18 of the baby bottle 12.

A heating element 60 is integrated into the baby bottle 12 and the heating element 60 is in thermal communication with the baby bottle 12 thereby facilitating the heating element 60 to heat the baby bottle 12 when the heating element 60 is turned on. In this way the heating element 60 can heat the fluid baby food 14 in the baby bottle 12. The heating element 60 is integrated into the outer wall 18 of the baby bottle 12 and the heating element 60 extends around a full diameter of the lower portion 24 of the outer wall 18 of the baby bottle 12. Additionally, the heating element 60 may comprise an electric heating element which may have an operational temperature ranging between approximately 70.0 degrees Fahrenheit and 100.0 degrees Fahrenheit.

A control unit 62 is integrated into the baby bottle 12 and the control unit 62 is in communication with the heating element 60. The control unit 62 actuates the heating element 60 to a selectable temperature thereby facilitating the fluid baby food 14 to be retained at the selected temperature. The control unit 62 comprises a control circuit 64 that is integrated into the baby bottle 12 and the control circuit 64 is electrically coupled to the heating element 60. The control circuit 64 receives an on input and the control circuit 64 receives an off input. The heating element 60 is turned on when the control circuit 64 receives the on input and the heating element 60 is turned off when the control circuit 64 receives the off input.

The control unit 62 includes a temperature sensor 66 that is integrated into the outer wall 18 of the baby bottle 12. The temperature sensor 66 is in thermal communication with the outer wall 18 thereby facilitating the temperature sensor 66 to detect a temperature of the outer wall 18. Additionally, the temperature sensor 66 is electrically coupled to the control circuit 64. The temperature sensor 66 may comprise an electronic temperature sensor or the like which as an operation sensitivity ranging between approximately 50.0 degrees Fahrenheit and 120.0 Fahrenheit.

The control unit 62 includes a temperature increase button 68 is movably integrated into an outer surface 70 of the lower portion 24 of the outer wall 18 thereby facilitating the temperature increase button 68 to be manipulated. The temperature increase button 68 is electrically coupled to the control circuit 64 and the temperature increase button 68 increases a trigger temperature of the heating element 60 toward a maximum temperature when the temperature increase button 68 is manipulated. The temperature increase button 68 may comprise a pair of intersecting members 70 such that the temperature increase button 68 has the ornamental appearance of a plus sign.

The control unit 62 includes a temperature decrease button 72 that is movably integrated into the outer surface 70 of the lower portion 24 of the outer wall 18 thereby facilitating the temperature decrease button 72 to be manipulated. The temperature decrease button 72 is electrically coupled to the control circuit 64 and the temperature decrease button 72 decreases the trigger temperature of the heating element 60 toward a minimum temperature when the temperature decrease button 72 is manipulated. Additionally, the temperature decrease button 72 may comprise an elongated member 74 such that the temperature decrease button 72 has the ornamental appearance of a minus sign. The control circuit 64 receives the off input when the temperature sensor 66 detects the temperature of the outer wall 18 exceeds the trigger temperature. Conversely, the control circuit 64 receives the on input when the temperature sensor 66 detects the temperature of the outer wall 18 is below the trigger temperature.

The control unit 62 includes a display 76 that is integrated into the outer surface 70 of the lower portion 24 of the outer wall 18 of the baby bottle 12 and the display 76 is electrically coupled to the control circuit 64. The display 76 displays indicia 78 comprising numbers to communicate the trigger temperature. Additionally, the display 76 may comprise an electronic display or the like and the display 76 may comprise a light emitting diode display or other type of electronic display 76.

The control unit 62 includes a power supply 80 that is integrated into the baby bottle 12 and the power supply 80 is electrically coupled to the control circuit 64. The power supply 80 comprises a rechargeable battery 82 that is integrated into the bottom wall 16 of the baby bottle 12. Additionally, the rechargeable battery 82 is electrically coupled to the control circuit 64. The control unit 62 includes a charge port 84 that is recessed into the outer surface 70 of the lower portion 24 of the outer wall 18 of the baby bottle 12 thereby facilitating the charge port 84 to insertably receive a charge cord 86. Additionally, the charge port 84 is electrically coupled to the rechargeable battery 82 for charging the rechargeable battery 82. The charge port 84 may comprise a type c universal serial bus port or other type of charge port.

The control unit 62 includes a light emitter 88 that is integrated into the outer surface 70 of the lower portion 24 of the outer wall 18 of the baby bottle 12. The light emitter 88 is electrically coupled to the rechargeable battery 82 and the light emitter 88 is turned on to emit light when a charge level of the rechargeable battery 82 falls below a predetermined charge level. In this way the light emitter 88 visually communicates that the rechargeable battery 82 needs to be recharged. Furthermore, the light emitter 88 may emit a first color of light when the rechargeable battery 82 needs to be charged and the light emitter 88 may emit a second color of light when the rechargeable battery 82 is fully charged. The light emitter 88 may comprise a light emitting diode or other type of electronic light emitter.

In use, the baby bottle 12 is filled with the fluid baby food 14 and a respective one of the nipples 42 is attached to the baby bottle 12. The temperature increase button 68 or the temperature decrease button 72 is manipulated to establish the trigger temperature and the trigger temperature is displayed on the display 76. The heating element 60 is turned on to heat the fluid baby food 14 to the trigger temperature. Additionally, the heating element 60 is continually turned on and off to maintain the fluid baby food 14 at the trigger temperature. In this way the fluid baby food 14 contained in the baby bottle 12 can be continuously maintained at the trigger temperature.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A heated baby bottle assembly for retaining baby formula at a desired temperature, said assembly comprising:
   a baby bottle for containing a fluid baby food;
   an insulating layer being wrapped around said baby bottle, said insulating layer being comprised of a thermally insulating material thereby inhibiting thermal communication between said baby bottle and ambient air;
   a pair of nipples, a respective one of said nipples being removably attachable to said baby bottle thereby facilitating said fluid baby food to be consumed through said respective nipple, each of said nipples having a dispensing aperture, said dispensing aperture in each of said nipples having a unique size with respect to each other to facilitate each of said nipples to dispense a unique amount of baby fluid with respect to each other;
   a heating element being integrated into said baby bottle, said heating element being in thermal communication with said baby bottle thereby facilitating said heating element to heat said baby bottle when said heating element is turned on thereby heating said fluid baby food in said baby bottle;
   a control unit being integrated into said baby bottle, said control unit being in communication with said heating element, said control unit actuating said heating element to a selectable temperature thereby facilitating said fluid baby food to be retained at the selected temperature;
   wherein said baby bottle has a bottom wall and an outer wall extending upwardly from said bottom wall, said outer wall having a distal edge with respect to said bottom wall defining an opening into said baby bottle, said outer wall having a lower portion being recessed with respect to an upper portion of said outer wall, said upper portion extending from said distal edge toward said bottom wall, an outer surface of said upper portion being threaded;
   wherein said heating element is integrated into said outer wall of said baby bottle, said heating element extending around a full diameter of said lower portion of said outer wall of said baby bottle;
   wherein said baby bottle has a viewing window extending through said outer wall thereby facilitating a level of the fluid baby food to be visible through said viewing window, said viewing window being elongated to extend substantially between a threshold of said upper portion of said outer wall and said bottom wall.

2. The assembly according to claim 1, further comprising a lens being positioned in said window such that said lens closes said window, said lens being comprised of a translucent material thereby facilitating said fluid baby food to be visible through said lens, said lens having indicia being applied to said lens, said indicia comprising a graduated scale thereby facilitating the fluid volume of said fluid baby food to be determined.

3. The assembly according to claim 1, wherein:
   each of said nipples has a top end and a bottom end, said bottom end of each of said nipples being open, each of said nipples curving inwardly at a middle of said nipples such that said top end of said nipples has a diameter being less than a diameter of said bottom end, said dispensing aperture associated with each of said nipples extending through said top end, each of said nipples having a groove extending inwardly on said nipples, said groove on a respective one of said nipples extending around a full circumference of said respective nipple, said groove on said respective nipple being spaced from said bottom end of said respective nipple; and
   a pair of collars, each of said collars extending around said bottom end of a respective one of said nipples, each of said collars having a lip extending into said groove on said respective nipple for retaining each of said collars on said respective nipple, each said collars having an inwardly facing surface, said inwardly facing surface of each of said collars being threaded to threadably engage said outer surface of said upper portion of said outer wall of said baby bottle.

4. The assembly according to claim 1, wherein said control unit comprises:

a control circuit being integrated into said baby bottle, said control circuit being electrically coupled to said heating element, said control circuit receiving an on input, said control circuit receiving an off input, said heating element being turned on when said control circuit receives said on input, said heating element being turned off when said control circuit receives said off input; and a temperature sensor being integrated into said outer wall of said baby bottle, said temperature sensor being in thermal communication with said outer wall thereby facilitating said temperature sensor to detect a temperature of said outer wall, said temperature sensor being electrically coupled to said control circuit.

5. The assembly according to claim 4, further comprising a temperature increase button being movably integrated into an outer surface of said lower portion of said outer wall thereby facilitating said temperature increase button to be manipulated, said temperature increase button being electrically coupled to said control circuit, said temperature increase button increasing a trigger temperature of said heating element toward a maximum temperature when said temperature increase button is manipulated.

6. The assembly according to claim 4, wherein:

said assembly includes a temperature decrease button being movably integrated into an outer surface of said lower portion of said outer wall thereby facilitating said temperature decrease button to be manipulated, said temperature decrease button being electrically coupled to said control circuit, said temperature decrease button decreasing said trigger temperature of said heating element toward a minimum temperature when said temperature decrease button is manipulated; and said control circuit receiving said off input when said temperature sensor detects the temperature of said outer wall exceeds said trigger temperature, said control circuit receiving said on input when said temperature sensor detects the temperature of said outer wall is below said trigger temperature.

7. The assembly according to claim 4, further comprising a display being integrated into said outer surface of said lower portion of said outer wall of said baby bottle, said display being electrically coupled to said control circuit, said display displaying indicia comprising numbers to communicate said trigger temperature.

8. The assembly according to claim 4, further comprising a power supply being integrated into said baby bottle, said power supply being electrically coupled to said control circuit, said power supply comprising:

a rechargeable battery being integrated into said bottom wall of said baby bottle, said rechargeable battery being electrically coupled to said control circuit;

a charge port being recessed into said outer surface of said lower portion of said outer wall of said baby bottle thereby facilitating said charge port to insertably receive a charge cord, said charge port being electrically coupled to said rechargeable battery for charging said rechargeable battery; and a light emitter being integrated into said outer surface of said lower portion of said outer wall of said baby bottle, said light emitter being electrically coupled to said rechargeable battery, said light emitter being turned on to emit light when a charge level of said rechargeable battery falls below a predetermined charge level.

9. A heated baby bottle assembly for retaining baby formula at a desired temperature, said assembly comprising:

a baby bottle for containing a fluid baby food, said baby bottle having a bottom wall and an outer wall extending upwardly from said bottom wall, said outer wall having a distal edge with respect to said bottom wall defining an opening into said baby bottle, said outer wall having a lower portion being recessed with respect to an upper portion of said outer wall, said upper portion extending from said distal edge toward said bottom wall, an outer surface of said upper portion being threaded, said baby bottle having a viewing window extending through said outer wall thereby facilitating a level of the fluid baby food to be visible through said viewing window, said viewing window being elongated to extend substantially between a threshold of said upper portion of said outer wall and said bottom wall;

a lens being positioned in said window such that said lens closes said window, said lens being comprised of a translucent material thereby facilitating said fluid baby food to be visible through said lens, said lens having indicia being applied to said lens, said indicia comprising a graduated scale thereby facilitating the fluid volume of said fluid baby food to be determined;

an insulating layer being wrapped around said baby bottle, said insulating layer being comprised of a thermally insulating material thereby inhibiting thermal communication between said baby bottle and ambient air, said insulating layer completely covering said lower portion of said outer wall and said bottom wall, said insulating layer having an opening extending through said insulating layer, said opening being aligned with said window;

a pair of nipples, a respective one of said nipples being removably attachable to said baby bottle thereby facilitating said fluid baby food to be consumed through said respective nipple, each of said nipples having a dispensing aperture, said dispensing aperture in each of said nipples having a unique size with respect to each other to facilitate each of said nipples to dispense a unique amount of baby fluid with respect to each other, each of said nipples having a top end and a bottom end, said bottom end of each of said nipples being open, each of said nipples curving inwardly at a middle of said nipples such that said top end of said nipples has a diameter being less than a diameter of said bottom end, said dispensing aperture associated with each of said nipples extending through said top end, each of said nipples having a groove extending inwardly on said nipples said groove on a respective one of said nipples extending around a full circumference of said respective nipple, said groove on said respective nipple being spaced from said bottom end of said respective nipple;

a pair of collars, each of said collars extending around said bottom end of a respective one of said nipples, each of said collars having a lip extending into said groove on said respective nipple for retaining each of said collars on said respective nipple, each said collars having an inwardly facing surface, said inwardly facing surface of each of said collars being threaded to threadably engage said outer surface of said upper portion of said outer wall of said baby bottle;

a heating element being integrated into said baby bottle, said heating element being in thermal communication with said baby bottle thereby facilitating said heating element to heat said baby bottle when said heating element is turned on thereby heating said fluid baby food in said baby bottle, said heating element being integrated into said outer wall of said baby bottle, said heating element extending around a full diameter of said lower portion of said outer wall of said baby bottle; and a control unit being integrated into said baby bottle, said control unit being in communication with said heating element, said control unit actuating said heating element to a selectable temperature thereby facilitating said fluid baby food to be retained at the selected temperature, said control unit comprising:

a control circuit being integrated into said baby bottle, said control circuit being electrically coupled to said heating element, said control circuit receiving an on input, said control circuit receiving an off input, said heating element being turned on when said control circuit receives said on input, said heating element being turned off when said control circuit receives said off input;

a temperature sensor being integrated into said outer wall of said baby bottle, said temperature sensor being in thermal communication with said outer wall thereby facilitating said temperature sensor to detect a temperature of said outer wall, said temperature sensor being electrically coupled to said control circuit;

a temperature increase button being movably integrated into said outer surface of said lower portion of said outer wall thereby facilitating said temperature increase button to be manipulated, said temperature increase button being electrically coupled to said control circuit, said temperature increase button increasing a trigger temperature of said heating element toward a maximum temperature when said temperature increase button is manipulated;

a temperature decrease button being movably integrated into an outer surface of said lower portion of said outer wall thereby facilitating said temperature decrease button to be manipulated, said temperature decrease button being electrically coupled to said control circuit, said temperature decrease button decreasing said trigger temperature of said heating element toward a minimum temperature when said temperature decrease button is manipulated, said control circuit receiving said off input when said temperature sensor detects the temperature of said outer wall exceeds said trigger temperature, said control circuit receiving said on input when said temperature sensor detects the temperature of said outer wall is below said trigger temperature;

a display being integrated into said outer surface of said lower portion of said outer wall of said baby bottle, said display being electrically coupled to said control circuit, said display displaying indicia comprising numbers to communicate said trigger temperature; and a power supply being integrated into said baby bottle, said power supply being electrically coupled to said control circuit, said power supply comprising:

a rechargeable battery being integrated into said bottom wall of said baby bottle, said rechargeable battery being electrically coupled to said control circuit;

a charge port being recessed into said outer surface of said lower portion of said outer wall of said baby bottle thereby facilitating said charge port to insertably receive a charge cord, said charge port being electrically coupled to said rechargeable battery for charging said rechargeable battery; and a light emitter being integrated into said outer surface of said lower portion of said outer wall of said baby bottle, said light emitter being electrically coupled to said rechargeable battery, said light emitter being turned on to emit light when a charge level of said rechargeable battery falls below a predetermined charge level.

* * * * *